Jan. 5, 1971   E. N. MAY, JR   3,552,034

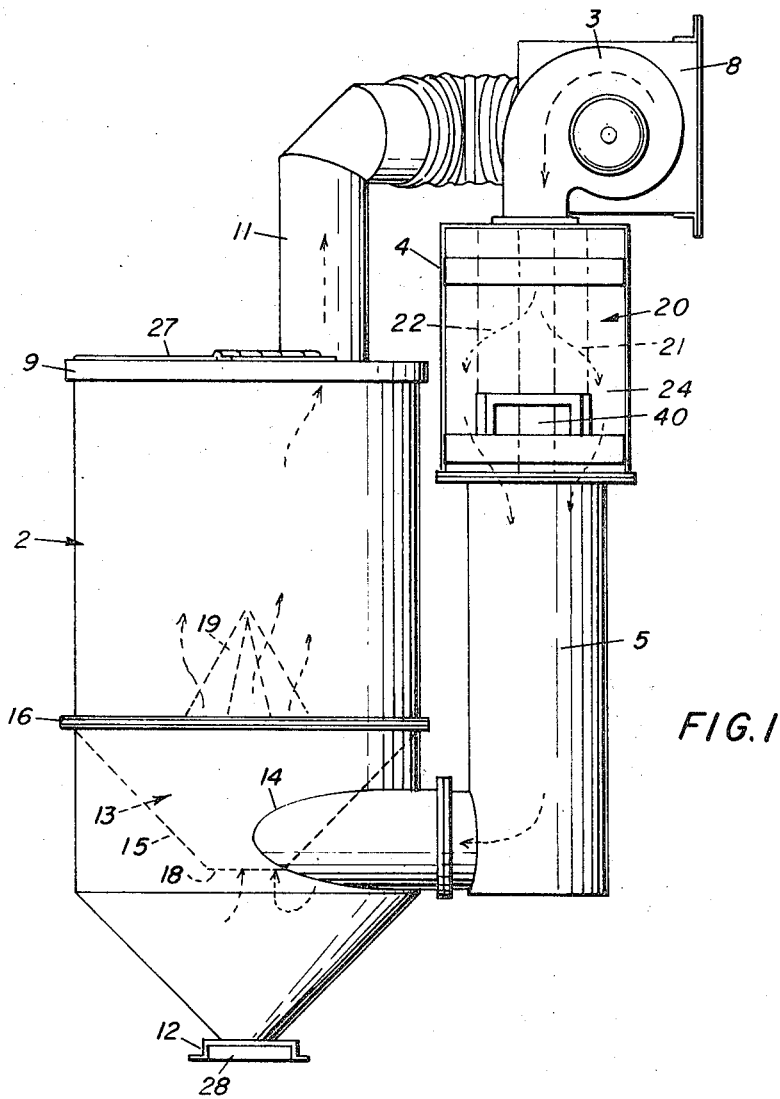
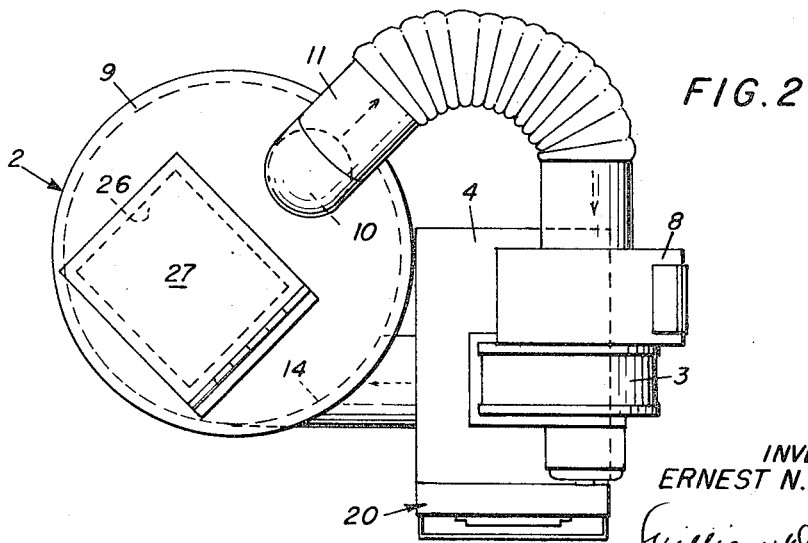

PARTICLE DRYING APPARATUS

Filed June 17, 1968   2 Sheets-Sheet 2

INVENTOR
ERNEST N. MAY, JR.

BY William W. Stokes
ATTORNEY

United States Patent Office 3,552,034
Patented Jan. 5, 1971

3,552,034
PARTICLE DRYING APPARATUS
Ernest N. May, Jr., Washington, D.C., assignor to Universal Dynamics Corporation, Woodbridge, Va., a corporation of Virginia
Filed June 17, 1968, Ser. No. 737,632
Int. Cl. F26b *21/04*
U.S. Cl. 34—80                     1 Claim

ABSTRACT OF THE DISCLOSURE

An apparatus for drying particulate material comprising a vertical drying chamber having a gas inlet and outlet and a particle inlet and outlet, a desiccant chamber housing removable desiccant cartridges, and means for circulating drying gas in the apparatus. A gas-solid separator, such as a filter or cyclone may be provided to clean the recirculating gas before it enters the desiccant chamber to be dried.

---

Figure 3:
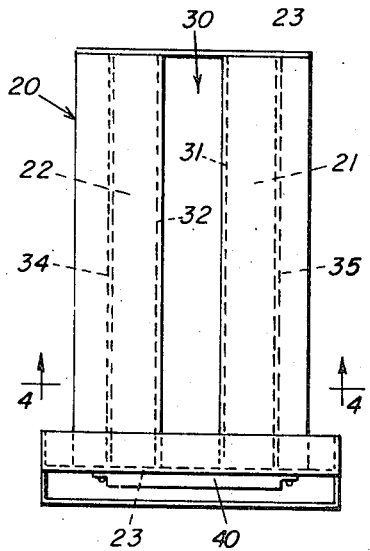

This invention relates to an apparatus for drying particulate material. This invention further relates to an apparatus for drying particulate matter which utilizes recirculated gases dried by a desiccant type dehumidifier. More particularly, the present invention relates to an apparatus for drying heat-sensitive particulate material with recirculated, dehumidified gases.

At the present time numerous gas recirculating, hopper-type dryers are known in the art and utilized for drying particulate matter. However, these units are not economically feasible for drying relatively small quantities of feed material. Such prior art dryers for particulate matter have not found wide use for relatively low feed rates due to problems inherent in their structure, size and operation. Generally, these units are combinations of bulky components which, due to their size and cost, must be used at high feed rates to be economically practical.

One of the prime factors contributing to the high cost and bulkiness of present dehumidifying dryers is the type of dehumidifier used. There is known in the art recirculating gas dryers for particulate matter employing what is termed in the art as "fully automatic dehumidifier," usually of the desiccant type. These known units have the disadvantage of requiring elaborate desiccant regeneration systems, multiple desiccant containers, gas heaters and blowers, and complex gas flow switching systems or the like.

The present invention eliminates the disadvantages of known recirculating gas dryers for particulate matter by providing a small, compact system utilizing a removable desiccant cartridge which can be reactivated for reuse. The spent desiccant cartridge is reactivated outside of the drying unit, thereby eliminating the bulky automatic desiccant regeneration system employed in prior art dryers. The cartridge may be equipped with a moisture indicator to signal the operator when the desiccant has become saturated to the extent that the cartridge should be replaced. A fresh cartridge is substituted for the spent cartridge, which is then reactivated according to known procedures. In the preferred embodiment, the desiccant cartridge comprises a pair of vertical desiccant beds which are rectangular in cross-section. The beds contain a desiccant material suitable for removing the humidity or water vapor present in air passing through or in contact with the desiccant. The two beds are preferably spaced apart with an air space between the two beds. Perforated walls permit air to flow from the air space into the desiccant material and out the outer perforated wall.

Accordingly, it is an object of this invention to provide a recirculating gas dryer which can be economically used to dry particulate matter in which the particulate matter is supplied at relatively low feed rates.

It is another object of this invention to provide a small, compact drying unit for treating heat-sensitive particles.

A further object of this invention is to provide a compact recirculating gas dryer for particulate matter in which readily removable cartridges containing regeneratable desiccant material are used to dry the recirculating gases which are then heated and forced countercurrently to the particulate matter being dried and returned to the desiccant cartridge in a recirculatory flow.

Figure 4:
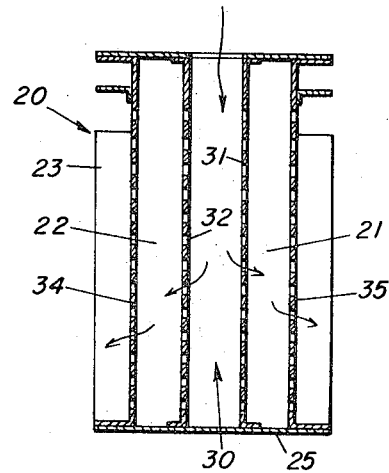
Figure 5:
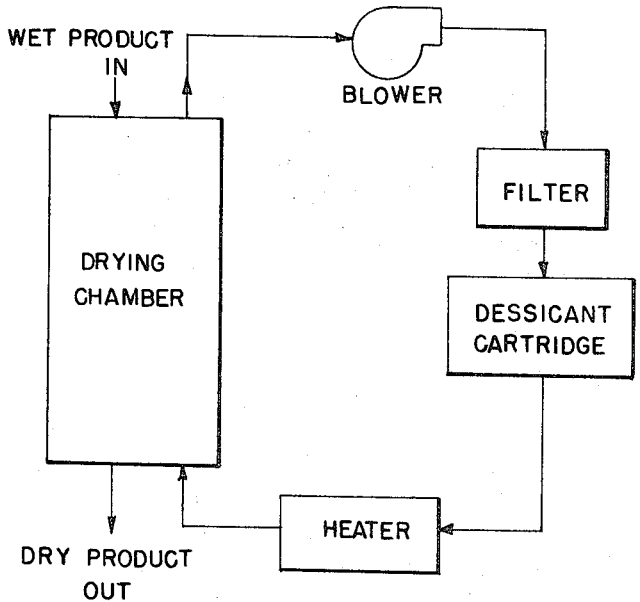

Other objects will appear from the detailed description of the invention below and from the attached drawings wherein:

FIG. 1 is a front elevation of the dryer system;
FIG. 2 is a plan view thereof;
FIG. 3 is a top view of a desiccant cartridge;
FIG. 4 is a sectional view of the desiccant cartridge taken along the line 4—4 of FIG. 3; and
FIG. 5 is a schematic drawing of a typical drying process.

Referring now to the drawings, the drying system includes a cylindrical drying chamber 2, blower 3, desiccant cartridge housing 4, heating unit 5, and particle filter 8, all interconnected in an essentially air-tight, closed-circuit drying system.

Drying chamber 2 is covered by roof 9 having a gas outlet 10 connected to the inlet of filter 8 by means of gas duct 11. Particles to be dried are fed into the drying chamber 2 through inlet 26 which is normally covered by door 27. The flow of particles through outlet 28 at the bottom of drying chamber 2 is controlled by gate valve 12.

In FIG. 1, a gas spreading device 13 is positioned within drying chamber 2 immediately above gas inlet 14, forming a plenum chamber 6 in the bottom of drying chamber 2. The gas spreading device, or "spreader cone" so named due to its structural configuration, comprises a frusto-conical section 15 having an upper rim 16 which fits snugly around the inner circumference of the drying chamber 2 above the gas inlet 14. In order to facilitate an even gas flow, a plurality of perforated gas directing members 19 are vertically arranged in the frame of the gas spreader.

The purpose of the spreader cone is to distribute the drying gas throughout the material being dried while permitting a flow of the material downwardly through the drying chamber 2 and out through gate valve 12.

The gas outlet 10 from the drying chamber 2 is connected to filter 8 with gas duct 11. Filter 8 serves to remove from the circulating gases any entrained particles of the material being dried in drying chamber 2. An alternative to the filter could be a cyclone separator mounted on top of the drying chamber 2. Also, the blower may be placed before the filter, as in the schematic process drawing shown as FIG. 5.

Blower 3, with its inlet attached to the outlet of filter 8 provides the necessary moving force to circulate the gas through the drying system. The circulating gas is forced from the blower 3 into the desiccant housing 4 and passes through the desiccant cartridge beds 21 and 22 wherein humidity of the circulating gas is reduced to a level suitable for drying particles in drying chamber 2. FIGS. 3 and 4 show the removable desiccant cartridge which forms an essential part of this invention. FIG. 3 shows the top view of the desiccant cartridge in which an open space 30 between the two desiccant baskets 21 and 22 permits air to enter and flow through the interior perforated walls 31 and 32 of the desiccant baskets 21 and 22. The outer or exterior perforated walls 34 and 35 permit air to leave the desiccant baskets 21 and 22 after the moisture or humidity of the air has been removed by the desiccant. The outlet of desiccant housing 4 is connected to heater 5. Any type of indirectly fired heater is suitable for use here with the prepared embodiment being an electric heater controlled by a thermostat at the outlet of heater 5 or in the inlet 14 to the drying chamber 2. The heater 5 is connected to inlet 14 of the drying chamber 2 to provide a flow of dry heated air to the drying chamber.

The desiccant cartridge 20 is designed to be readily removed and replaced by a single operator. The weight of the desiccant cartridge is kept preferably below about 20 pounds so that they may be easily handled by one person. Each cartridge is supplied with an indicator desiccant material contained within the cartridge behind window 40 to indicate, by color change or other suitable indication, the relative state of moisture saturation of the actual desiccant material in baskets 21 and 22. Experience will indicate to the operator at what point, as shown by the indicator, it is desirable to remove the partially saturated cartridge and replace it with an unsaturated cartridge.

When the desiccant has become saturated with water absorbed from the moisture laden gases, the cartridge is removed from its housing and replaced by an unsaturated unit. The spent cartridge can be reactive according to procedures well-known in the art such as by blowing a hot gas through the desiccant beds to vaporize and drive off the trapped moisture. This reactivation operation advantageously takes place in a unit separate from the dryer apparatus. If desired, the reactivation unit can be set up to serve several dryer units since the time necessary to reactivate the desiccant material contained in the cartridge is usually substantially less than the time period in which the cartridge is useful in the drying apparatus for removing humidity and moisture from the circulating gases. In any event, the reactivation step does not interfere with the operation of the drying apparatus.

In operation, the drying unit is maintained as air-tight as possible to prevent moisture from the surrounding ambient air from entering the closed system and prematurely saturating the desiccant. Material to be dried is placed inside drying chamber 2 to the desired level. The dryer system is activated and the blower 3 started. Air, driven by blower 3 enters the top of desiccant housing 4 and is forced into the open space 30 between the two desiccant baskets 21 and 22. The perforated inner walls 31 and 32 of the baskets permit the air to enter the desiccant baskets 21 and 22 and contact the desiccant contained therein. The desiccant material removes all or part of the moisture content of the air and the dry air leaves the desiccant baskets through the perforated outer walls 34 and 35 of the desiccant baskets. The dry air then exits the desiccant housing 4 into the heater 5 wherein the temperature of the air is increased to the desired level for optimum drying conditions. The heater is controlled by a thermostat or other temperature control means in the outlet of the heater 5 to maintain a constant air temperature.

The dry heated air then enters the drying chamber 2 through inlet 14 into the plenum chamber 6 at the bottom of drying chamber 2. The gas is evenly distributed and caused to flow in an even pattern upwardly through the particulate material being dried by the gas spreader 13 and perforated gas directing members 19. The gas spreader 13 and perforated gas directing members 19 further serve the function of supporting the particulate material being dried while permitting a downward flow of the particulate matter into the plenum chamber 6 and out through particle outlet 28.

The air travels upward and countercurrent to the particulate matter being dried and removes moisture therefrom. The air, now cooled and moisture-laden, leaves the drying chamber 2 through outlet 11 and enters filter 8 wherein suspended particulate matter is removed. The air then enters the inlet of the blower and is recycled through the desiccant and heater as described above.

Alternately, the filter may be placed after the blower in the flow diagram, such as is indicated in the schematic FIG. 5.

After an initial period of drying, the dry particulate matter may be withdrawn from the bottom of the drying chamber 2 through gate valve 12 and more wet particulate matter added at the top of drying chamber 2 thus providing for a continuous drying system. It will be necessary to provide means for introducing the wet particulate matter into the drying chamber without entrance of a significant amount of ambient air so that the desiccant is not unduly saturated wtih moisture from the ambient air. Devics well known in the art, such as star valves and other seal means will permit such operation.

Many modifications obvious to those skilled in the art may be made upon the system and apparatus of this invention without deviating from the scope and intent of the invention. For instance, the apparatus may be operated without the use of a heater, if dry air at ambient temperatures serves the needs of the materials being dried. Similarly, if ambient conditions are such that ambient air may be heated and utilized as the drying gas without use of the desiccant, the cartridges may be omitted. Furthermore, the desiccant cartridges can be used as multiple units, either in series or parallel, to provide longer life of high capacities. Of course, many other modifications may readily be made by those skilled in the art and the inventor desires to be limited as to the scope of his invention only by the appended claim.

I claim:

1. An apparatus for drying particulate material with heated, desiccated gas comprising a vertical drying chamber provided with a particle inlet, a particle outlet, a gas inlet, a gas outlet and support means for said particulate material intermediate said gas inlet and said gas outlet, said support means distributing the upward flow of said gas substantially evenly throughout said particulate matter and permitting downward flow of particulate matter, said gas outlet connected to a blower for applying superatmospheric pressure to the gas passing therethrough and to a filter and to a gas drying means comprising a desiccant cartridge housing and at least one removable desiccant cartridge, and to a gas heater for adjusting the temperature of the gas, and to said gas inlet to said vertical drying chamber, each of said desiccant cartridges comprising a pair of spaced-apart desiccant baskets containing a desiccant material suitable for removing moisture from air, said baskets each having an inner perforated wall and an outer perforated wall, said cartridges constructed and arranged to permit air to flow from a common open space between said baskets, through said inner perforated wall into contact with said desiccant material and out through said outer perforated wall.

References Cited

UNITED STATES PATENTS

| 334,987 | 1/1886 | Shedd | 34—174X |
| 2,066,847 | 1/1937 | McShea | 34—80 |
| 2,495,612 | 1/1950 | Trimble | 34—80 |
| 3,243,942 | 4/1966 | Burke | 55—387 |

FOREIGN PATENTS

| 542,128 | 11/1955 | Belgium | 34—77 |
| 884,378 | 4/1943 | France | 34—169 |

MARTIN P. SCHWADRON, Primary Examiner

H. B. RAMEY, Assistant Examiner